(12) United States Patent
Sai et al.

(10) Patent No.: US 8,804,011 B2
(45) Date of Patent: Aug. 12, 2014

(54) IMAGING DEVICE

(75) Inventors: Hirotomo Sai, Yokohama (JP); Shinichi Nonaka, Zushi (JP); Akira Irinouchi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 13/329,429

(22) Filed: Dec. 19, 2011

(65) Prior Publication Data

US 2012/0154646 A1 Jun. 21, 2012

(30) Foreign Application Priority Data

Dec. 21, 2010 (JP) ................. 2010-283925

(51) Int. Cl.
*H04N 9/64* (2006.01)
(52) U.S. Cl.
USPC .......................... 348/246; 348/247
(58) Field of Classification Search
None
See application file for complete search history.

(56) References Cited

U.S. PATENT DOCUMENTS

| | | | | |
|---|---|---|---|---|
| 6,809,763 B1* | 10/2004 | Yoshida | ................. | 348/248 |
| 2008/0129848 A1* | 6/2008 | Yamauchi | ................. | 348/246 |
| 2008/0239112 A1* | 10/2008 | Naito | ................. | 348/246 |
| 2009/0245683 A1* | 10/2009 | Sasaki | ................. | 382/275 |
| 2010/0066872 A1 | 3/2010 | Yamaguchi | | |
| 2010/0271523 A1* | 10/2010 | Hara | ................. | 348/302 |

FOREIGN PATENT DOCUMENTS

| | | |
|---|---|---|
| JP | 2007-129339 | 5/2007 |
| JP | 2010-074240 | 4/2010 |
| JP | 2010-093471 | 4/2010 |
| JP | 2010-273378 | 12/2010 |

OTHER PUBLICATIONS

Office Action issued in connection with corresponding Japanese Patent Application No. JP 2010-083925, mailed Nov. 12, 2013 with partial English translation thereof.

* cited by examiner

*Primary Examiner* — Roberto Velez
*Assistant Examiner* — Yih-Sien Kao
(74) *Attorney, Agent, or Firm* — Antonelli, Terry, Stout & Kraus, LLP.

(57) ABSTRACT

An imaging device includes an imaging unit having an imaging element to conduct photoelectric conversion on incident light from a subject and output an electric signal, a signal gain control unit for controlling an output signal level of the imaging unit, a plurality of defective pixel correction units for correcting defective pixels contained in a signal output from the signal gain control unit, an image signal processing unit for generating an image signal from a signal which is output from the defective pixel correction units, a temperature measurement unit for measuring temperature in the vicinity of the imaging element, and a system control unit for generally controlling the imaging unit, the signal gain control unit, the correction units, and the image signal processing unit. The system control unit uses the plurality of defective pixel correction units jointly and causes them to operate according to occurrence causes of defective pixels.

3 Claims, 3 Drawing Sheets

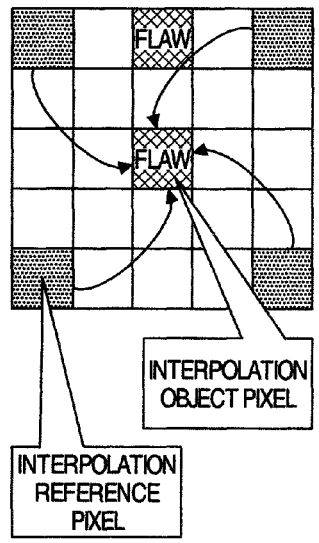
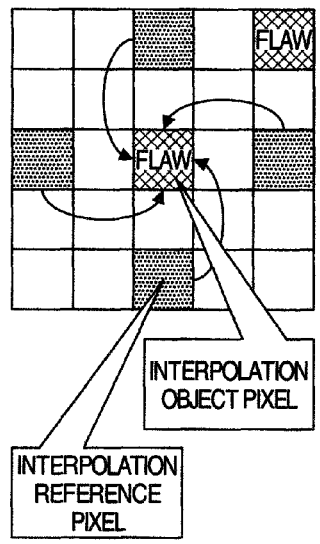
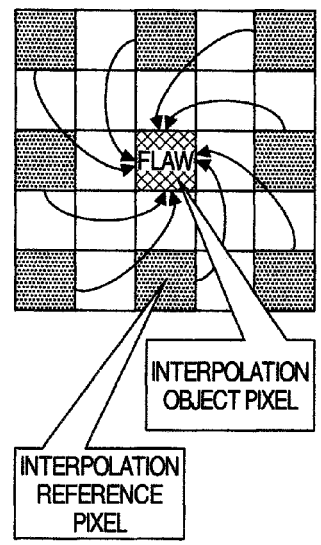
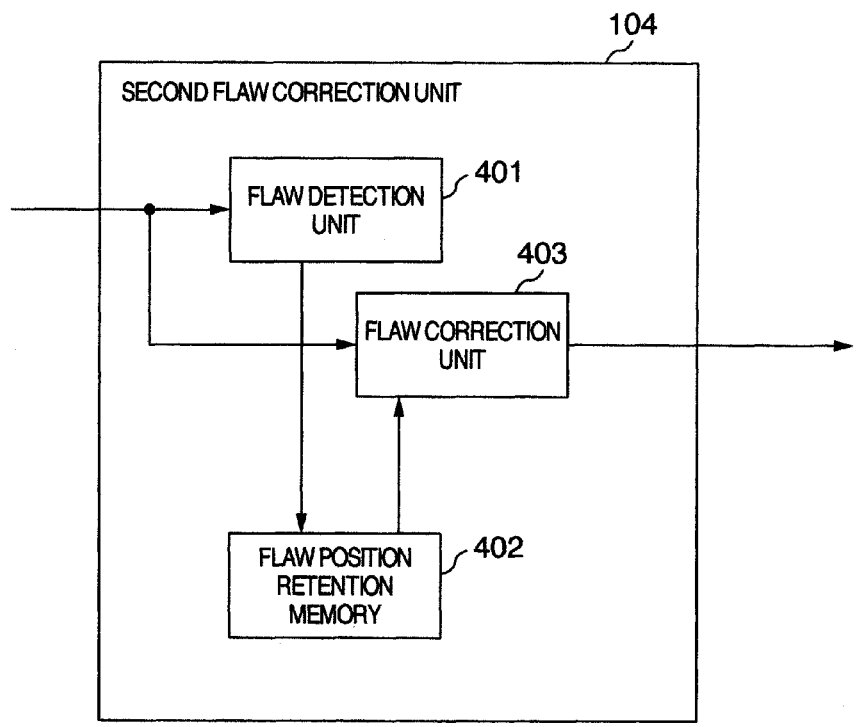

IMAGING DEVICE

INCORPORATION BY REFERENCE

The present application claims priority from Japanese application JP2010-283925 filed on Dec. 21, 2010, the content of which is hereby incorporated by reference into this application.

BACKGROUND OF THE INVENTION

The present invention relates to an imaging device having a function of correcting pixel defects.

As a background technique in the present technical field, for example, JPA-2010-273378 can be mentioned. According to ABSTRACT of JP-A-2010-273378, PROBLEM TO BE SOLVED is to provide an imaging device that can accurately detect a defect even if dark current noise occurs when performing noise reduction, and can prevent as much as possible reduction of an imaging dynamic range caused by increase of dark current noise; and a noise elimination method; and a noise elimination program using the imaging device. According to SOLUTION in ABSTRACT, an imaging device includes: an imaging means including a plurality of pixels for imaging a subject; a bright-state signal acquisition means for acquiring a bright-state signal obtained in a light non-shielding state; a dark-state signal acquisition means for acquiring a dark-state signal obtained in a light-shielding state; a first amplification means for amplifying the obtained bright-state signal or dark-state signal; a subtraction means for subtracting the acquired dark-state signal from the acquired bright-state signal and outputting a subtraction signal; a second amplification means for amplifying the subtraction signal as a result of the subtraction; an imaging condition acquiring means for acquiring an imaging condition when acquiring the bright-state signal; and a gain correcting means for changing gains of the first amplification means and the second amplification means based on the acquired imaging condition.

SUMMARY OF THE INVENTION

For example, in the typical imaging device such as a digital camera or a digital video camera, an imaging element for conducting photoelectric conversion on incident light is used. In the imaging element, there is the so-called pixel defect (flaw) such as a pixel which is different in output characteristics, or a pixel which outputs an abnormally high signal. If a signal which is output by the imaging element is used as it is, therefore, a bad influence is exerted upon the picture quality. In the CMOS sensor used for high pixel counts in recent years, a flaw appears remarkably as compared with the CCD sensor. This flaw is caused by a different factor, such as, for example, an imaging element, or signal amplification in photoelectric conversion conducted by the imaging element. Furthermore, the number and intensity of flaws change depending upon an environmental change such as exposure to cosmic rays and the temperature change. For attaining a higher picture quality in the digital camera or the digital video camera, means for correcting these flaws are needed.

Hereafter, typical flaw correcting techniques for correcting such flaws will be described. First, shooting is conducted in a state in which the shutter is closed, and a dark-state image is stored in a memory. Then, ordinary shooting is conducted in a state in which the shutter is opened, and a bright-state image is obtained. Flaw correction is implemented by subtracting the dark-state image from the obtained bright-state image.

JP-A-2010-273378 proposes an imaging device which accurately detects a defect even if dark current noise occurs when performing noise reduction, by changing gains for a bright-state signal, a dark-state signal, and a signal obtained by subtracting the dark-state signal from the bright-state signal according to the temperature. In this technique, correction of a saturated pixel in the bright-state image cannot be conducted accurately. In addition, two images, that is, the dark-state image and the bright-state image must be acquired whenever shooting is conducted, and consequently this technique is not suitable for shooting of a moving picture.

On the other hand, a method of previously detecting a defective pixel and storing its pixel position in a memory, estimating a defective pixel value from pixel values of neighboring normal pixels by using, for example, average computation, and conducting correction is also known. In the CMOS sensor used for high pixel counts in recent years, however, there are a considerably large number of defective pixels and occurrence positions of defective pixels and their intensities differ according to the imaging condition. In the method of storing the defective pixel positions and conducting correction, therefore, all defective pixels are always corrected, resulting in a degraded picture quality.

Therefore, an object of the present invention is to provide an imaging device which corrects flaws differing in occurrence cause, accurately without degrading the picture quality especially in a moving picture.

To solve the above problem one of configurations of the claims is adopted.

According to the present invention, flaws which differ in occurrence cause, that is, which change in appearance state depending upon the gain setting, the temperature, the exposure time and the like, can be corrected accurately without remarkably degrading the picture quality.

Problems, configurations and effects other than those described above will be elucidated by ensuing description of embodiments.

BRIEF DESCRIPTION OF THE DRAWINGS

FIGS. 3A to 3C are diagrams for explaining an example of a method for correcting a flaw in a first flaw correction unit 103;

FIG. 4 is a diagram for explaining an example of a basic configuration of a second flaw correction unit 104.

DETAILED DESCRIPTION OF THE INVENTION

Hereafter, embodiments of the present invention will be described with reference to the drawings.

Figure 1:
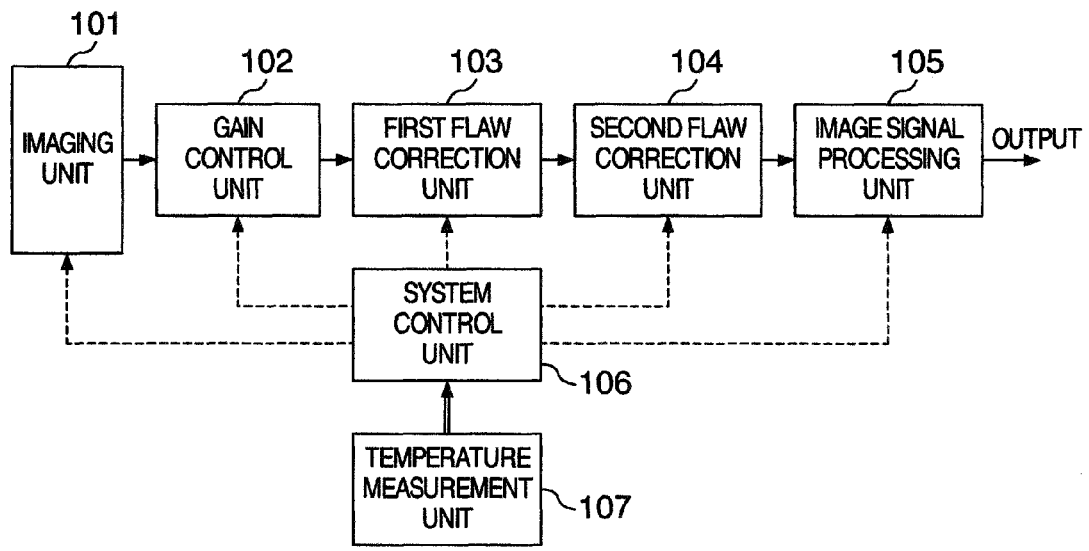
FIG. 1 is a diagram for explaining an example of a basic configuration in the present invention.

Embodiments of the present invention will be described in detail. FIG. 1 is a diagram for explaining an example of a basic configuration in the present invention. An imaging unit 101 is formed of a lens group including a zoom lens and a focus lens, an iris, a shutter, and an imaging element such as a CCD or a CMOS. The imaging element conducts photoelectric conversion on a received optical image, and outputs a result as a signal. A gain control unit 102 is formed of a CDS, an AGC, and an AD converter. The gain control unit 102 amplifies an output signal of the imaging unit 101. A first flaw correction unit 103 and a second flaw correction unit 104 corrects a pixel defect of the imaging element generated in the imaging unit 101 or a defect in signal amplification in the photoelectric conversion conducted by the imaging element. A method for correction will be described later. In the present embodiment, two flaw correction units are included as an example. However, at least two flaw correction units, for example, as many flaw correction units as the number of flaw occurrence causes may be included. As a result, it becomes possible to conduct flaw correction further accurately without picture quality degradation. An image signal processing unit 105 conducts predetermined processing on an image signal supplied from the second flaw correction unit 104, and outputs a resultant signal. By the way, the predetermined processing is image signal processing such as noise removal, gamma correction, contour emphasis, filter processing, zoom processing, hand shaking correction, and image recognition conducted on the image signal supplied from the second flaw correction unit 104, and output interface processing for conducting conversion to a signal format of an output device such as a TV set or a storage. The output interface processing is, for example, conversion to a video output of the NTSC or PAL, conversion to an HDMI signal, or conversion to a predetermined signal for network transmission. A temperature measurement unit 107 measures a temperature around the imaging element. A system control unit 106 controls the imaging unit 101, the gain control unit 102, the first flaw correction unit 103, the second flaw correction unit 104, and the image signal processing unit 105 by using information obtained from the temperature measurement unit 107 as occasion demands.

Figure 2:
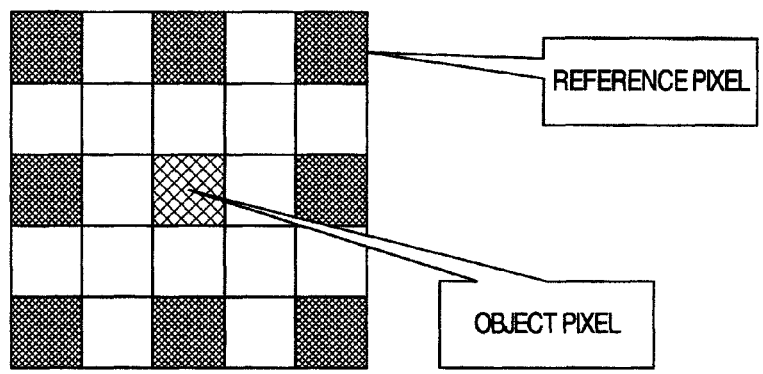
FIG. 2 is a diagram for explaining an example of a method for detecting a flaw in a first flaw correction unit 103.

FIG. 2 is a diagram for explaining an example of a method for detecting a flaw in the first flaw correction unit 103. A square lattice indicates a pixel arrangement in the imaging element. Typically, different color filters are arranged every 2 by 2. The same color filter is arranged every two horizontal pixels and every two vertical line. In other words, it is determined whether an object pixel shown in FIG. 2 is a defective pixel by comparing the object pixel with eight peripheral pixels shown in FIG. 2. A difference between the object pixel and each of the eight peripheral pixels is found. If in at least n pixels out of eight pixels the difference is greater than a threshold which is set by the system control unit 106, the object pixel is judged to have a flaw. Here, n is set by the system control unit 106.

FIGS. 3A to 3C are diagrams for explaining an example of a method for correcting a flaw in the first flaw correction unit 103. An interpolation method is changed over as described below depending upon whether a position of a flaw detected by using the above-described method or the like exists not only in a correction object position but also in eight peripheral pixels. If a flaw position exists in a vertical or horizontal cross direction as shown in FIG. 3A, then four reference pixels in oblique directions are used as interpolation reference pixels, and the flaw pixel is interpolated by using an average value of the four interpolation reference pixels. If a flaw position exists in an oblique direction as shown in FIG. 3B, then four reference pixels in the vertical and horizontal cross directions are used as interpolation reference pixels, and the flaw pixel is interpolated by using an average value of the four interpolation reference pixels. If the flaw position exists neither in the vertical or horizontal cross direction nor in the oblique direction, then eight reference pixels in the vertical and horizontal cross directions and the oblique directions are used as interpolation reference pixels, and the flaw pixel is interpolated by using an average value of the eight interpolation reference pixels.

FIG. 4 is a diagram for explaining an example of a basic configuration of the second flaw correction unit 104. A flaw detection unit 401 conducts flaw detection during a time period between start of power supply to the imaging device and output of a picture. For detecting a flaw, it is necessary to shield light by, for example, closing the iris. For example, in a video camera, there is little chance of shielding light once the video camera is brought into a recordable state. Therefore, it becomes important to detect as many flaws as possible when the camera is started. A flaw position retention memory 402 stores positions of pixels detected as flaws by the flaw detection unit 401. A flaw correction unit 403 reads out flaw position information from the flaw position retention memory 402. With respect to a pixel judged to have a flaw, the flaw correction unit 403 conducts interpolation on the flaw pixel in the same way as the above-described method used by the first flaw correction unit 103 to correct a flaw.

Figure 5:
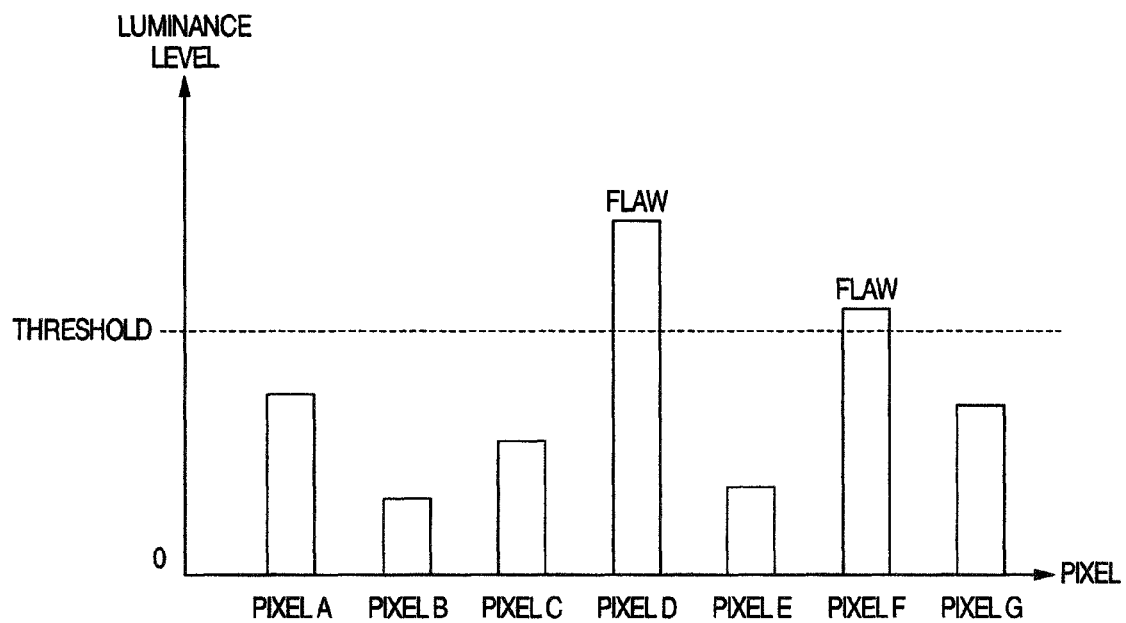
FIG. 5 is a diagram for explaining an example of a method for detecting a flaw.

The flaw detection unit 401 shown in FIG. 4 will now be described in a complementary manner with reference to FIG. 5. FIG. 5 is a diagram for explaining an example of a method used by the flaw detection unit 401 to detect a flaw. The abscissa axis represents consecutive pixels in the horizontal direction. The ordinate axis represents a luminance level of each pixel. In the present embodiment, the flaw detection unit 401 compares the luminance level of each pixel with a flaw detection threshold which is set by the system control unit 106 shown in FIG. 1. If the luminance level is higher than the threshold, then the flaw detection unit 401 judges the pixel to be a defective pixel and detects the pixel as a flaw. According to the present technique, the so-called white flaw can be detected. According to the present technique, detection is possible even if flaws occur consecutively to adjoin each other. By the way, detection may be conducted by using a technique similar to that used by the first flaw correction unit 103.

Operation of the system control unit 106 shown in FIG. 1 will now be described in detail. The system control unit 106 controls exposure time in the imaging unit 106 and the signal gain in the gain control unit 102 to optimize the exposure state according to a shooting scene. Brightness of an output image is made constant by making the exposure time long and making the signal gain great in a dark scene and by making the exposure time short and making the signal gain small in a bright scene. If the signal gain is made great, that is, signal amplification in the photoelectric conversion is made great, then a pixel defect which is not usually generated appears because of a defect in a signal amplification part and the magnitude of the flaw signal becomes great in proportion to the gain. Furthermore, as causes of appearance of a pixel defect which does not occur usually, there is not only the signal gain but also the temperature. If the temperature rises, a pixel defect which does not usually occur appears. As the temperature rises, the magnitude of the flaw signal becomes great. Therefore, the system control unit 106 operates on the basis of the signal gain controlled by itself and the temperature obtained from the temperature measurement unit 107. If each of the magnitude of the signal gain and the temperature is at least a certain value, then the system control unit 106 judges that there is a dynamically generated flaw, predicts a signal level of a flaw on the basis of the magnitude of the signal gain and the temperature, sets the pixel defect detection threshold for the first flaw correction unit 103, and corrects the dynamically generated flaw.

When the imaging device is started, the system control unit 106 reads out video data from the imaging unit 101 under a condition that light is shielded by, for example, closing the iris, sets a predetermined threshold in the second flaw correction unit, and detects a stationary flaw caused by a defect of the photoelectric element itself. At this time, a flaw generated dynamically by an external cause may be detected simultaneously by, for example, prolonging the exposure time in the imaging unit 101, making the signal gain greater, or controlling the threshold according to the temperature.

In the present embodiment, correction can be conducted accurately without degrading the picture quality greatly by providing at least two correction units and using jointly a correction unit suitable for a flaw caused by a defect of a photoelectric element itself which usually occurs and a correction unit suitable for a dynamic flaw which changes according to the temperature and the signal gain, as described heretofore.

By the way, the present invention is not restricted to the above-described embodiment, but various modifications are included. For example, the embodiment has been described in detail to explain the present invention intelligibly, and the present invention is not necessarily restricted to an embodiment having all configurations described. Furthermore, it is possible to replace a part of a configuration of a certain embodiment by a configuration of another embodiment, and it is also possible to add a configuration of another embodiment to a configuration of a certain embodiment. Furthermore, it is possible to conduct addition, deletion or replacement of another configuration with respect to a part of a configuration of each embodiment.

As for each of the above-described configurations, a part or the whole thereof may be formed of hardware or may be implemented by executing a program in a processor. As for control lines and information lines, lines which are considered to be necessary for explanation are shown and all control lines and information lines in the product are not necessarily shown. As a matter of fact, it may be considered that almost all configurations are connected to each other.

The invention claimed is:

1. An imaging device comprising:
an imaging unit having an imaging element to conduct photoelectric conversion on incident light from a subject and output a resultant signal as an electric signal;
a signal gain control unit for controlling an output signal level of the imaging unit;
a plurality of defective pixel correction units for correcting defective pixels contained in a signal which is output from the signal gain control unit;
an image signal processing unit for generating an image signal from a signal which is output from the defective pixel correction units;
a temperature measurement unit for measuring temperature in vicinity of the imaging element; and
a system control unit for controlling the imaging unit, the signal gain control unit, the plurality of defective pixel correction units, and the image signal processing unit;
wherein the system control unit using the plurality of defective pixel correction units jointly and causing the plurality of defective pixel correction units to operate according to occurrence causes of defective pixels;
wherein one of the plurality of defective pixel correction units comprises a first correction unit;
wherein the first correction unit detects a defective pixel when a power supply is turned on, and has a memory for retaining defective pixel position information;
wherein the first correction unit determines a defective pixel in a signal which is output from the signal gain control unit, on the basis of the defective pixel position information, generates an interpolation signal from pixels located around the defective pixel, and replaces the defective pixel by the interpolation signal;
wherein the first correction unit is caused by the system control unit to correct a defective pixel which is always caused in the imaging unit by a defect in the photoelectric conversion; and
wherein the system control unit controls a threshold for determining whether there is a defect to be detected in defective pixel detection in the first correction unit, and causes always the first correction unit to conduct correction regardless of an external condition.

2. The imaging device according to claim 1, wherein
one of the plurality of defective pixel correction units comprises a second correction unit;
the second correction unit makes a decision whether each of differences between an object pixel and eight reference pixels having an identical color filter located around the object pixel is greater than a difference threshold;
if a number of reference pixels which is greater in difference than the difference threshold is greater than a predetermined number threshold, then the second correction unit regards the object pixel as a defective pixel, generates a predetermined interpolation signal from the reference pixels, and replaces the object pixel by the interpolation signal.

3. The imaging device according to claim 2, wherein
the second correction unit is caused by the system control unit to correct defective pixels which are caused in the imaging unit and the signal gain control unit by signal amplification in the photoelectric conversion and which are dynamically changed in positions, number and magnitude by temperature and a gain; and
the system control unit controls the difference threshold and the number threshold in dependence upon a gain of the signal gain control unit and the temperature measured by the temperature measurement unit.

* * * * *